US012730865B2

(12) United States Patent
Hao

(10) Patent No.: US 12,730,865 B2
(45) Date of Patent: Sep. 8, 2026

(54) AUTHENTICATION SYSTEM, AUTHENTICATION METHOD, AND COMPUTER READABLE MEDIUM

(71) Applicant: NEC Corporation, Tokyo (JP)

(72) Inventor: Jia Hao, Tokyo (JP)

(73) Assignee: NEC CORPORATION, Tokyo (JP)

( * ) Notice: Subject to any disclaimer, the term of this patent is extended or adjusted under 35 U.S.C. 154(b) by 145 days.

(21) Appl. No.: 18/849,618

(22) PCT Filed: Mar. 29, 2022

(86) PCT No.: PCT/JP2022/015480

§ 371 (c)(1),
(2) Date: Sep. 23, 2024

(87) PCT Pub. No.: WO2023/187996

PCT Pub. Date: Oct. 5, 2023

(65) Prior Publication Data

US 2025/0200151 A1 Jun. 19, 2025

(51) Int. Cl.
*G06F 21/00* (2013.01)
*G06F 21/31* (2013.01)
*G06V 30/416* (2022.01)

(52) U.S. Cl.
CPC ............ *G06F 21/31* (2013.01); *G06V 30/416* (2022.01)

(58) Field of Classification Search
CPC ........ G06F 21/31; G06F 21/36; G06V 30/416
See application file for complete search history.

(56) References Cited

U.S. PATENT DOCUMENTS 7,336,807 B2 * 2/2008 Tabata ................. G06V 40/161 382/103
11,301,706 B2 * 4/2022 Bjerre .................. G06V 10/993
(Continued)

FOREIGN PATENT DOCUMENTS

EP 3739547 A1 * 11/2020 ........... G06V 40/172
JP 2007-011770 A 1/2007
(Continued)

OTHER PUBLICATIONS

JP Office Communication for JP Application No. 2024-510798, mailed on Nov. 4, 2025 with English Translation.
(Continued)

*Primary Examiner* — Mahfuzur Rahman
(74) *Attorney, Agent, or Firm* — Sughrue Mion, PLLC

(57) ABSTRACT

An authentication system (1) includes a feature amount acquisition unit (11), a history information acquisition unit (12), an authentication unit (13), and an output unit (14). The feature amount acquisition unit (11) acquires an authentication target feature amount that is a feature amount of an authentication target image defined from an image obtained by imaging a predetermined authentication target object. The history information acquisition unit (12) acquires history information regarding an authentication history of the authentication target object on the basis of the authentication target feature amount. The authentication unit (13) performs authentication of the authentication target object on the basis of the authentication target feature amount and the history information. The output unit (14) outputs a result of the authentication.

11 Claims, 15 Drawing Sheets

(56) References Cited

U.S. PATENT DOCUMENTS

| | | | | |
|---|---|---|---|---|
| 2018/0005239 | A1 | 1/2018 | Schlesinger et al. | |
| 2020/0314330 | A1* | 10/2020 | Takayama | H04N 23/65 |
| 2020/0314331 | A1* | 10/2020 | Ouchi | G03B 17/561 |
| 2022/0132023 | A1* | 4/2022 | Kagaya | H04N 23/69 |
| 2022/0368825 | A1* | 11/2022 | Ouchi | H04N 23/61 |
| 2024/0104923 | A1* | 3/2024 | Akashi | G06V 40/197 |
| 2025/0200151 | A1* | 6/2025 | Hao | G06F 21/31 |

FOREIGN PATENT DOCUMENTS

| | | | |
|---|---|---|---|
| JP | 2007-094637 | A | 4/2007 |
| JP | 2008-079680 | A | 4/2008 |
| JP | 2012-069150 | A | 4/2012 |
| JP | 2014-067171 | A | 4/2014 |
| JP | 2019-125002 | A | 7/2019 |
| JP | 2020-013525 | A | 1/2020 |
| JP | 2020-064541 | A | 4/2020 |
| JP | 2021-043751 | A | 3/2021 |
| JP | 2022-027560 | A | 2/2022 |
| WO | 2005/071939 | A | 8/2005 |
| WO | 2020/022014 | A1 | 1/2020 |

OTHER PUBLICATIONS

International Search Report for PCT Application No. PCT/JP2022/015480, mailed on Jun. 28, 2022.

* cited by examiner

21

| AUTHENTICATION PROCESS EXECUTION DATE AND TIME (T) | ACQUIRED FEATURE AMOUNT (AUTHENTICATION TARGET FEATURE AMOUNT) | REFERRED-TO FEATURE AMOUNT (REFERENCE FEATURE AMOUNT) | AUTHENTICATION SCORE Cc |
|---|---|---|---|
| ⋮ | ⋮ | ⋮ | ⋮ |
| 11:15:02, JANUARY 29, 20** (T11) | F019 | F018 | 0.79 |
| 09:55:20, FEBRUARY 12, 20** (T12) | F020 | F019 | 0.86 |
| 10:19:32, MARCH 7, 20** (T13) | F021 | F020 | 0.83 |

Fig. 8

AUTHENTICATION SYSTEM, AUTHENTICATION METHOD, AND COMPUTER READABLE MEDIUM

This application is a National Stage Entry of PCT/JP2022/015480 filed on Mar. 29, 2022, the contents of all of which are incorporated herein by reference, in their entirety.

TECHNICAL FIELD

The present disclosure relates to an authentication system, an authentication method, and a computer readable medium.

BACKGROUND ART

There is a technique of determining authenticity of an object.

For example, Patent Literature 1 discloses a technique of storing a received random pattern and printed matter identification information in association with each other and enabling the stored printed matter to be usable in a case where a received terminal ID matches a terminal ID stored in a management table storage unit.

Patent Literature 2 discloses a technique of determining validity of the presence or absence of an original sensitized sheet on the basis of a pattern stored in a sensitized sheet and checking the presence or absence of an original copy on the basis of the pattern in a case where print content of a coded sensitized sheet is copied.

Patent Literature 3 discloses a technique of detecting a state parameter representing a state of paper and varying an extraction condition to be extracted as an identification target from pattern information based on a pattern of paper according to comparison between a state parameter serving as a reference and a state parameter detected after detection of the reference.

Patent Literature 4 discloses a technique of performing first collation for performing collation with a first feature that does not temporally change among features of an input pattern, and second collation for performing collation with a second feature that temporally changes among the features of the input pattern.

CITATION LIST

Patent Literature

Patent Literature 1: Japanese Unexamined Patent Application Publication No. 2021-043751

Patent Literature 2: International Patent Publication No. WO2005/071939

Patent Literature 3: Japanese Unexamined Patent Application Publication No. 2007-011770

Patent Literature 4: Japanese Unexamined Patent Application Publication No. 2012-069150

SUMMARY OF INVENTION

Technical Problem

Incidentally, there is a request for efficiently performing correct authentication when authenticating an object held by an individual for a long time and intended for authentication of the individual, such as a passport or a credit card.

In view of the above-described problems, an object of the present disclosure is to provide an authentication system or the like that efficiently authenticates an authentication target object.

Solution to Problem

An authentication system according to an aspect of the present disclosure includes feature amount acquisition means, history information acquisition means, authentication means, and output means. The feature amount acquisition means acquires an authentication target feature amount that is a feature amount of an authentication target image defined from an image obtained by imaging a predetermined authentication target object. The history information acquisition means acquires history information regarding an authentication history of the authentication target object on the basis of the authentication target feature amount. The authentication means performs authentication of the authentication target object on the basis of the authentication target feature amount and the history information. The output means outputs a result of the authentication.

In an authentication method according to an aspect of the present disclosure, a computer executes the following processes. The computer acquires an authentication target feature amount that is a feature amount of an authentication target image defined from an image obtained by imaging a predetermined authentication target object. The computer acquires history information regarding an authentication history of the authentication target object on the basis of the authentication target feature amount. The computer performs authentication of the authentication target object on the basis of the authentication target feature amount and the history information. The computer outputs a result of the authentication.

A non-transitory computer readable medium according to an aspect of the present disclosure causes a computer to execute the following method. The computer acquires an authentication target feature amount that is a feature amount of an authentication target image defined from an image obtained by imaging a predetermined authentication target object. The computer acquires history information regarding an authentication history of the authentication target object on the basis of the authentication target feature amount. The computer performs authentication of the authentication target object on the basis of the authentication target feature amount and the history information. The computer outputs a result of the authentication.

Advantageous Effects of Invention

According to the present disclosure, it is possible to provide an authentication system or the like that efficiently authenticates an authentication target object.

BRIEF DESCRIPTION OF DRAWINGS

FIG. 8 is a table illustrating history information.

EXAMPLE EMBODIMENT

Figure 1:
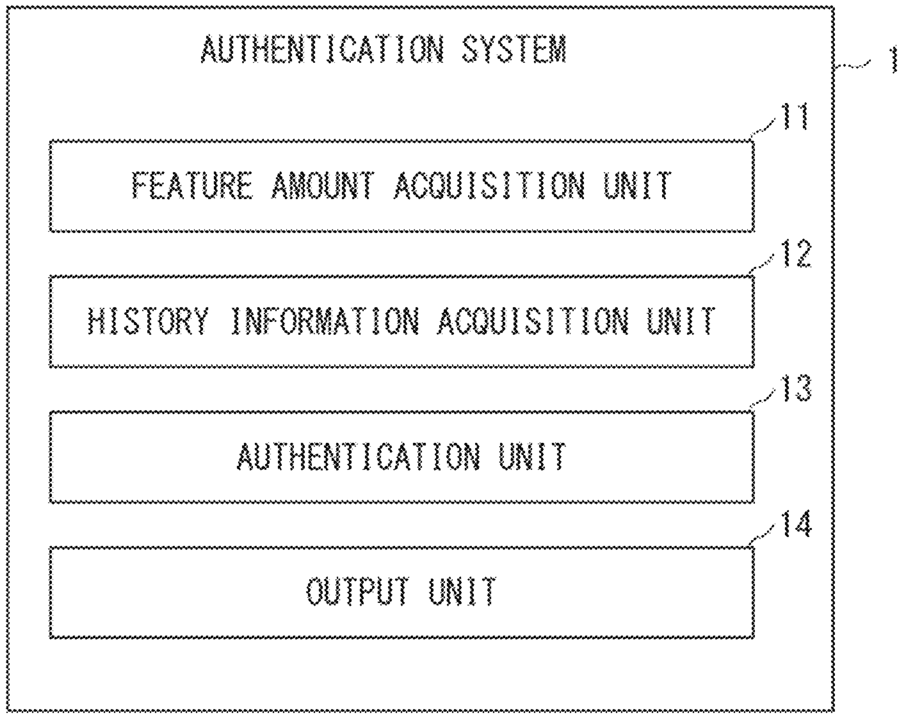
FIG. 1 is a block diagram of an authentication system according to a first example embodiment.

Hereinafter, the present disclosure will be described through example embodiments, but the disclosure according to the claims is not limited to the following example embodiments. Not all the configurations described in the example embodiments are essential as means for solving the problem. In the drawings, the same elements are denoted by the same reference numerals, and repeated description is omitted as necessary.

First Example Embodiment

A first example embodiment of the present disclosure will be described. FIG. 1 is a block diagram of an authentication system according to a first example embodiment. An authentication system 1 illustrated in FIG. 1 is a system for authenticating a predetermined authentication target object. The predetermined authentication target object is owned by an individual, and is used a plurality of times by the individual who is its owner, for example, for one year to several years. The predetermined authentication target object is, for example, an ID card such as a passport, an annual ticket for a theme park, a credit card, a student card, an employee card, or an insurance card.

The authentication system 1 may be configured by, for example, a calculation apparatus, a computer, or a server having a communication function. In the following description, a "computer" may include any one of a server apparatus, a blade server, and a cloud computing system. The authentication system 1 acquires image data of an image obtained by imaging an authentication target object with a predetermined camera, and authenticates a person who is about to pass through the passage gate by using the acquired image data. The authentication system 1 outputs a result of the authentication to another constituent connected to the authentication system 1. The authentication system 1 includes a feature amount acquisition unit 11, a history information acquisition unit 12, an authentication unit 13, and an output unit 14 as main constituents.

The feature amount acquisition unit 11 acquires an authentication target feature amount. The authentication target feature amount is a feature amount of an authentication target image defined from an image obtained by imaging a predetermined authentication target object. The authentication target image is a predetermined region in the captured image of the authentication target object. The authentication target image is set for the authentication system 1 to authenticate the authentication target object. The feature amount acquisition unit 11 may acquire the authentication target feature amount from an external constituent, or may acquire the authentication target feature amount by the feature amount acquisition unit 11 extracting the authentication target feature amount. In addition, the feature amount acquisition unit 11 may acquire the authentication target image from an external constituent. The feature amount acquisition unit 11 may define the authentication target image from the captured image of the authentication target object.

The history information acquisition unit 12 acquires history information corresponding to the authentication target feature amount acquired by the feature amount acquisition unit 11. The history information is information regarding an authentication history of the authentication target object. The authentication history is a history of authentication received by the authentication target object at a time before the feature amount acquisition unit 11 acquires the authentication target feature amount. The history information acquisition unit 12 uses, for example, the authentication target feature amount acquired by the feature amount acquisition unit 11 to acquire history information corresponding to the authentication target feature amount. More specifically, for example, the history information acquisition unit 12 acquires the history information by requesting the history information to a predetermined external constituent by using the authentication target feature amount acquired by the feature amount acquisition unit 11.

Note that, in the following description, a time before the feature amount acquisition unit 11 acquires the authentication target feature amount may be referred to as "past", and a time at which the feature amount acquisition unit 11 acquires the authentication target feature amount or a time at which the authentication system 1 performs authentication on the basis of the authentication target feature amount acquired by the feature amount acquisition unit 11 may be referred to as "current". That is, the authentication history included in the history information is a history of authentication received by the authentication target object in the past. The history information acquisition unit 12 may acquire history information from a storage device (not illustrated) in the authentication system 1.

The history information may include various types of information in past authentication. For example, the history information may include the authentication target feature amount acquired by the feature amount acquisition unit 11 in the past authentication. Alternatively, the history information may include history information acquired by the history information acquisition unit 12 in the past authentication. The history information is information indicating how the authentication unit 13 has authenticated the authentication target object in the past authentication, and may include, for example, a threshold used in the authentication or a score of the authentication. Furthermore, the history information may include information regarding the date and time related to the past authentication.

The authentication unit 13 performs authentication of the authentication target object. Specifically, the authentication unit 13 performs authentication of the authentication target object by using the authentication target feature amount. In this authentication, the authentication unit 13 also uses the history information. In other words, the authentication unit 13 refers to the history information when authenticating the authentication target feature amount. More specifically, for example, the authentication unit 13 collates the authentication target feature amount with the history information when determining whether the authentication target feature amount exceeds a predetermined authentication level. Note that the authentication unit 13 may determine whether to perform authentication, for example, by inputting the authentication target feature amount and the history information to a predetermined trained model.

The output unit 14 outputs a result of the authentication. More specifically, the output unit 14 may output the result of the authentication as a predetermined signal to an external constituent to which the authentication system 1 is communicatively connected.

Figure 2:
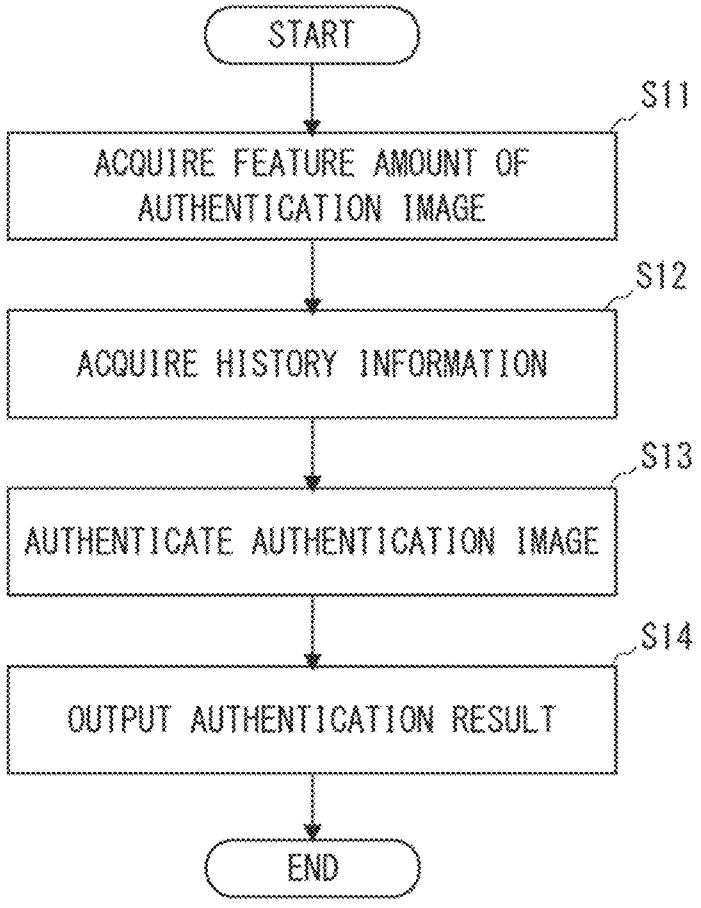
FIG. 2 is a flowchart illustrating an authentication method according to the first example embodiment.

Next, processing executed by the authentication system 1 will be described with reference to FIG. 2. FIG. 2 is a flowchart illustrating an authentication method according to the first example embodiment. The flowchart of FIG. 2 is started, for example, when the authentication system 1 acquires image data.

First, the feature amount acquisition unit 11 acquires an authentication target feature amount that is a feature amount of an authentication target image defined from an image obtained by imaging a predetermined authentication target object (step S11). When acquiring the authentication target feature amount, the feature amount acquisition unit 11 supplies the acquired authentication target feature amount to the authentication unit 13.

Next, the history information acquisition unit 12 acquires history information regarding an authentication history of the authentication target object corresponding to the authentication target feature amount (step S12). When acquiring the history information, the history information acquisition unit 12 supplies the acquired history information to the authentication unit 13.

Next, the authentication unit 13 performs authentication of the authentication target object by using the authentication target feature amount received from the feature amount acquisition unit 11 and the history information received from the history information acquisition unit 12 (step S13). When authentication of the authentication target object is performed, the authentication unit 13 supplies information regarding a result of the authentication to the output unit 14.

Finally, the output unit 14 outputs the authentication result received from the authentication unit 13 to a predetermined output destination (step S14). When the output unit 14 outputs the result of the authentication, the authentication system 1 ends a series of processes.

The authentication system according to the first example embodiment has been described above. Note that the authentication system 1 may include a processor and a storage device as constituents (not illustrated). The storage device included in the authentication system 1 includes, for example, a storage device including a nonvolatile memory such as a flash memory or a solid state drive (SSD). In this case, the storage device included in the authentication system 1 stores a computer program (hereinafter, also simply referred to as a program) for executing the above-described image processing method. In addition, the processor reads the computer program from the storage device into a buffer memory such as a dynamic random access memory (DRAM), and executes the program.

Each constituent of the authentication system 1 may be realized by dedicated hardware. Some or all of the constituent elements may be implemented by general-purpose or dedicated circuitry, a processor, or the like, or a combination thereof. These constituent elements may be configured with a single chip or may be configured with a plurality of chips connected via a bus. Some or all of constituent elements of each apparatus may be implemented by a combination of the above-described circuit or the like and a program. Furthermore, as the processor, a central processing unit (CPU), a graphics processing unit (GPU), a field-programmable gate array (FPGA), or the like may be used. Note that the description regarding the configuration described here can also be applied to other apparatuses or systems described below in the present disclosure.

In addition, in a case where some or all of the constituent elements of the authentication system 1 are implemented by a plurality of authentication systems, circuits, and the like, the plurality of authentication systems, circuits, and the like may be disposed in a centralized manner or in a distributed manner. For example, the authentication systems, the circuits, or the like may be implemented in the form of a client server system, a cloud computing system, or the like in which they are connected to each other via a communication network. In addition, the function of the authentication system 1 may be provided in software as a service (SaaS) format. In addition, the above-described method may be stored in a computer readable medium to cause a computer to execute the method.

According to the present example embodiment, it is possible to provide an authentication system or the like that efficiently authenticates an authentication target object.

Second Example Embodiment

Figure 3:
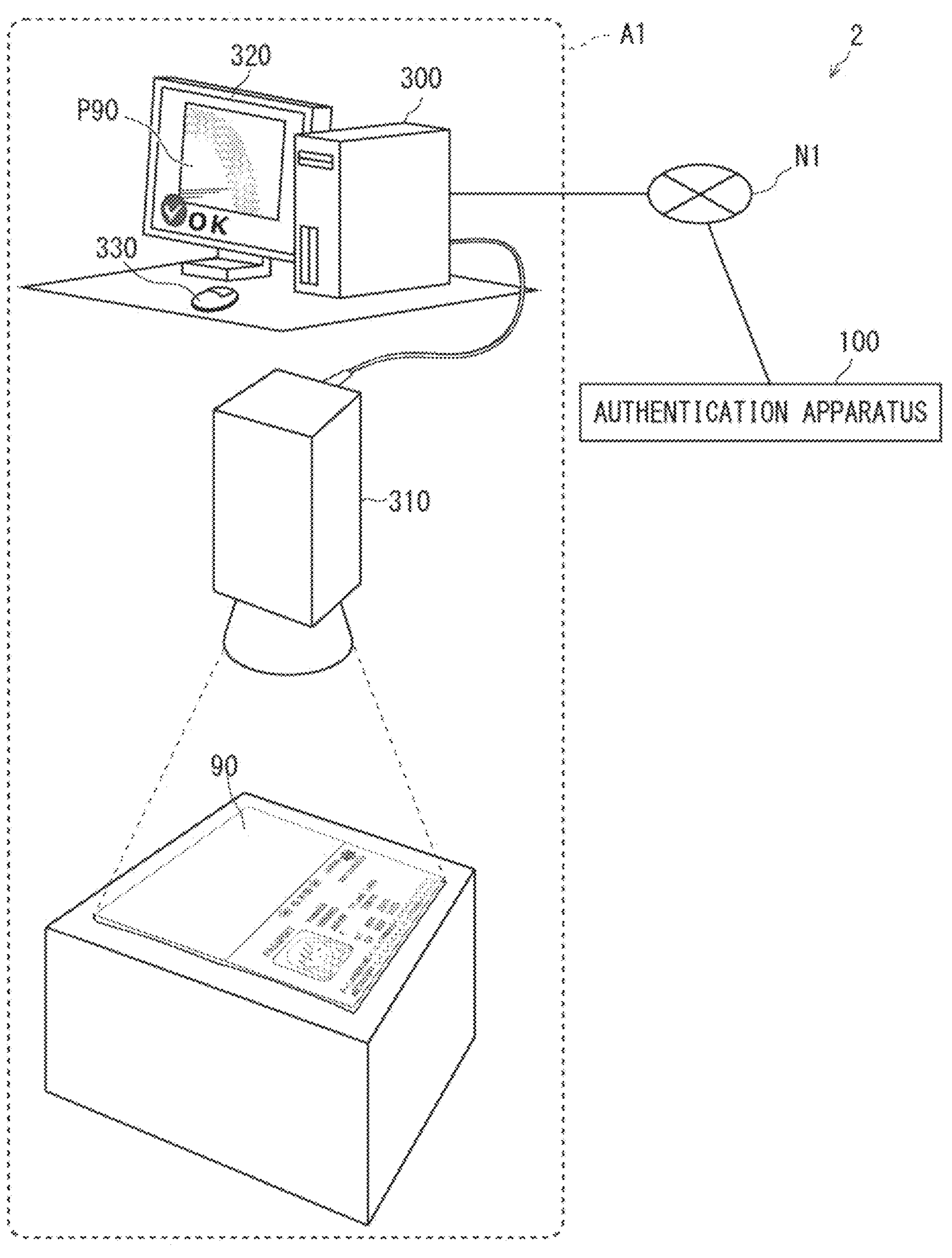
FIG. 3 is a diagram illustrating a usage mode of the authentication system according to a second example embodiment.

A second example embodiment of the present disclosure will be described. FIG. 3 is a diagram illustrating a usage mode of an authentication system according to the second example embodiment. An authentication system 2 illustrated in FIG. 3 is used when passengers pass through customs at an airport A1. The authentication system 2 includes an authentication apparatus 100, a user terminal 300, a camera 310, a display apparatus 320, and an information input apparatus 330 as main constituents. The user terminal 300, the camera 310, the display apparatus 320, and the information input apparatus 330 are installed at the airport A1. The authentication apparatus 100 and the user terminal 300 are communicatively connected to each other via a network N1.

The authentication apparatus 100 is a computer installed at any place. The authentication apparatus 100 is communicatively connected to the user terminal 300 via the network N1. The authentication apparatus 100 receives, from the user terminal 300, the authentication target feature amount of the image of the authentication target object 90 captured by the camera 310, and authenticates the received authentication target feature amount. The authentication apparatus 100 supplies a signal indicating a result of the authentication to the user terminal 300.

The user terminal 300 is a terminal apparatus installed at the airport A1, and for example, an administrator who manages the user terminal 300 at the airport A1 uses the user terminal 300. The user terminal 300 acquires image data from the camera 310, performs predetermined processing on the acquired image data, and extracts the authentication target feature amount. The user terminal 300 supplies the extracted authentication target feature amount to the authentication apparatus 100.

The user terminal 300 receives a signal related to a result of the authentication from the authentication apparatus 100, and displays the result of the authentication indicated by the received signal on the display apparatus 320. In addition, the user terminal 300 may display an image captured by the camera 310 on the display apparatus 320.

The camera 310 captures an image of a passport that is the authentication target object 90, and generates image data. The camera 310 supplies the generated image data to the user terminal 300.

The display apparatus 320 is a display apparatus connected to the user terminal 300, and includes, for example, a liquid crystal panel or an organic electroluminescence panel for displaying various types of information. The display apparatus 320 illustrated in FIG. 3 displays an authentication target image P90 extracted from a captured image of the authentication target object 90 and "OK" for authentication.

The information input apparatus 330 is an apparatus for an administrator who manages the user terminal 300 to operate the user terminal 300, and includes, for example, a button and a keyboard used for a user to input information. Furthermore, the information input apparatus 330 may be a touch panel overlapping on the display apparatus 320.

Figure 4:
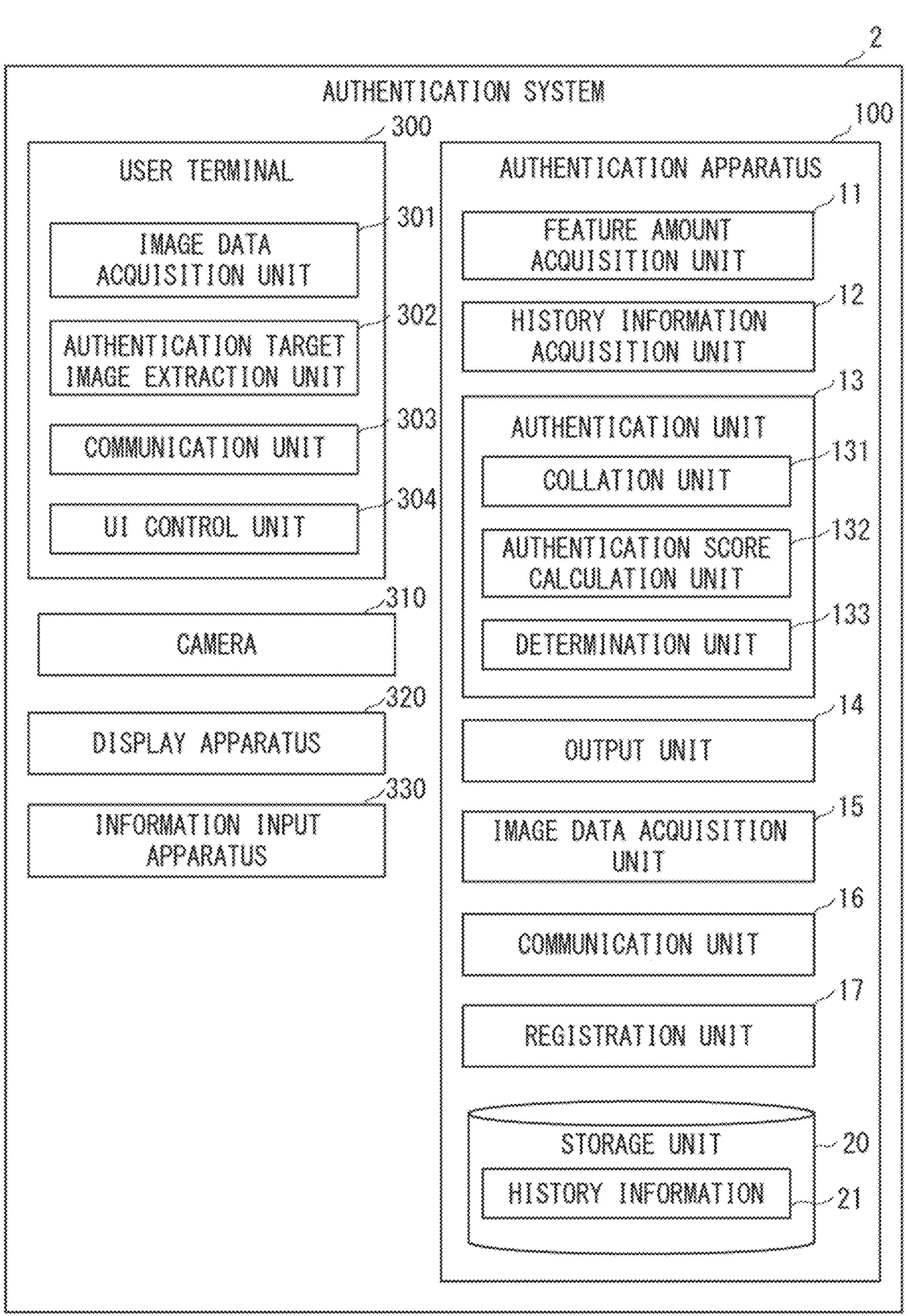
FIG. 4 is a block diagram of an authentication system according to the second example embodiment.

Next, the authentication system 2 will be further described with reference to FIG. 4. FIG. 4 is a block diagram of the authentication system 2 according to the second example embodiment. The authentication system 2 includes an authentication apparatus 100, a user terminal 300, a camera 310, a display apparatus 320, and an information input apparatus 330 as main constituents.

(Authentication Apparatus)

Hereinafter, the authentication apparatus 100 included in the authentication system 2 will be described. The authentication apparatus 100 includes a feature amount acquisition unit 11, a history information acquisition unit 12, an authentication unit 13, an output unit 14, an image data acquisition unit 15, a communication unit 16, a registration unit 17, and a storage unit 20 as main constituents.

The feature amount acquisition unit 11 acquires an authentication target feature amount from an authentication target image received from the user terminal 300 by the image data acquisition unit 15. The authentication target feature amount in the present example embodiment is a feature amount of an authentication target image defined from a captured image of the authentication target object 90.

The history information acquisition unit 12 acquires history information corresponding to the authentication target feature amount acquired by the feature amount acquisition unit 11. Specifically, the history information acquisition unit 12 according to the present example embodiment retrieves and reads history information corresponding to the authentication target feature amount acquired by the feature amount acquisition unit 11 from the storage unit 20. The history information acquisition unit 12 acquires history information including a reference feature amount of an authentication target image acquired at a time before a time at which the authentication target feature amount is acquired. That is, it can be said that the history information acquisition unit 12 acquires the reference feature amount corresponding to the authentication target feature amount acquired by the feature amount acquisition unit 11.

The reference feature amount is an authentication target feature amount of the authentication target object 90 acquired by the authentication system 2 in the past. The authentication system 2 authenticates the authentication target object 90 by collating the authentication target feature amount acquired from the current authentication target object 90 with the authentication target feature amount acquired in the past (that is, the reference feature amount).

The authentication unit 13 authenticates the authentication target object 90 by collating the authentication target feature amount with the reference feature amount. The authentication unit 13 includes a collation unit 131, an authentication score calculation unit 132, and a determination unit 133.

The collation unit 131 collates the authentication target feature amount acquired by the feature amount acquisition unit 11 with the reference feature amount included in the history information acquired by the history information acquisition unit 12, and detects a match point and a mismatch point between the two.

The authentication score calculation unit 132 calculates an authentication score from a result of the collation performed by the collation unit 131. The authentication score is an index indicating a result of the above-described collation. In the example illustrated here, the minimum value of the authentication score is 0 (zero), and the maximum value is 1.0. The authentication score of zero indicates that the authentication target feature amount and the reference feature amount do not match at all. In addition, the authentication score of 1.0 indicates that the authentication target feature amount and the reference feature amount completely match.

The determination unit 133 evaluates the authentication score calculated by the authentication score calculation unit 132, and determines whether to authenticate the authentication target object 90 related to the authentication target feature amount. More specifically, for example, the determination unit 133 compares the authentication score with a predetermined threshold. In a case where the authentication score is equal to or more than the threshold, the authentication unit 13 determines to authenticate the authentication target object 90. In a case where the authentication score is less than the threshold, the authentication unit 13 determines not to authenticate the authentication target object 90.

As described above, the authentication unit 13 calculates the authentication score by collating the authentication target feature amount with the reference feature amount, and compares the value of the authentication score with the predetermined threshold to authenticate the authentication target object 90. Note that the authentication score may be paraphrased as an authentication level. Alternatively, the authentication score may be paraphrased as the degree of similarity or the degree of coincidence between the authentication target feature amount and the reference feature amount indicated as a result of the collation.

The output unit 14 outputs a result of the authentication. More specifically, the output unit 14 outputs the result of the authentication as a predetermined signal to the user terminal 300 to which the authentication system 1 is communicatively connected.

The image data acquisition unit 15 acquires the image data of the authentication target image from the user terminal 300. The image data acquisition unit 15 supplies the received image data to the feature amount acquisition unit 11. The image data acquisition unit 13 may supply the image data to the feature amount acquisition unit 11 after performing predetermined processing such as tone adjustment on the received image data.

The communication unit 16 is an interface for the authentication system 2 to communicate with the user terminal 300 via the network N1. For example, the communication unit 16 supplies a signal indicating the result of the authentication output by the output unit 14 to the user terminal 300.

The registration unit 17 registers the reference feature amount in the history information. Specifically, for example, the registration unit 17 receives a request for registering a reference feature amount of a new authentication target object from the user terminal 300, and stores, in response to the request, a feature amount supplied from the user terminal 300 in the storage unit 20 as a feature amount of the new authentication target object, that is, a reference feature amount.

The storage unit 20 is a storage device including a nonvolatile memory such as a flash memory, an SSD, or a hard disk drive (HDD). The storage unit 20 stores at least history information 21. When the authentication target object 90 is authenticated, the storage unit 20 receives predetermined information regarding the authentication from the authentication unit 13, and updates the history information to the received information. More specifically, the storage unit 20 causes the authentication target feature amount to be included in the history information as a reference feature amount after the end of the authentication.

(User Terminal 300)

The user terminal 300 includes an image data acquisition unit 301, an authentication target image extraction unit 302, a communication unit 303, and a UI control unit 304 as main constituents.

The image data acquisition unit 301 acquires image data from the camera 310. The image data acquired from the camera 310 is data of an image obtained by the camera 310 imaging at least a part of the authentication target object 90, and includes the authentication target image.

The authentication target image extraction unit 302 extracts the authentication target image from the image data acquired by the image data acquisition unit 301. Extracting the authentication target image indicates, for example, cutting out a predetermined region from the image captured by the camera 310. The authentication system 2 authenticates the authentication target object 90 by observing a change in the predetermined region in the authentication target object 90. Therefore, the predetermined region extracted by the authentication target image extraction unit 302 is a certain region defined in the authentication target object 90. The authentication target image is preferably, for example, a region where a temporal change is easily observed.

It is effective to prevent a third party from forgery or the like that the region of the authentication target image in the authentication target object 90 is not made clear to an owner or the like. In addition, the authentication target image preferably has a size that is difficult to observe with naked eyes, for example. The size that is difficult to observe with naked eyes is, for example, a size of about 1000 micrometers square. By setting the authentication target image as described above, forgery of the authentication target object 90 can be suppressed. The authentication target image may also be an image that cannot be observed with visible light regardless of a size of the image. As a result, the authentication system 2 can suppress forgery of the authentication target object 90.

The communication unit 303 is an interface for the user terminal 300 to communicate with the authentication apparatus 100 via the network N1. That is, the communication unit 303 supplies the authentication target image extracted by the authentication target image extraction unit 302 to the authentication apparatus 100. Furthermore, the communication unit 303 receives a signal indicating a result of the authentication from the authentication apparatus 100.

The UI control unit 304 controls a user interface (UI) for the administrator of the user terminal 300. For example, the UI control unit 304 displays various types of information on the display apparatus 320, and reflects the input received from the information input apparatus 330 on the user terminal 300. The UI control unit 304 controls the above-described interface for outputting information and receiving input information and an application program for controlling internal processing.

The camera 310 images the authentication target object 90 to generate predetermined image data, and supplies the generated image data to the user terminal 300. The camera 310 may be capable of panning, tilting, and zooming. Furthermore, a plurality of cameras 310 may be provided. In addition, the camera 310 may be a visible light camera or a camera capable of capturing infrared light or ultraviolet light.

Next, processing executed by the authentication system 2 will be described.

Figure 5:
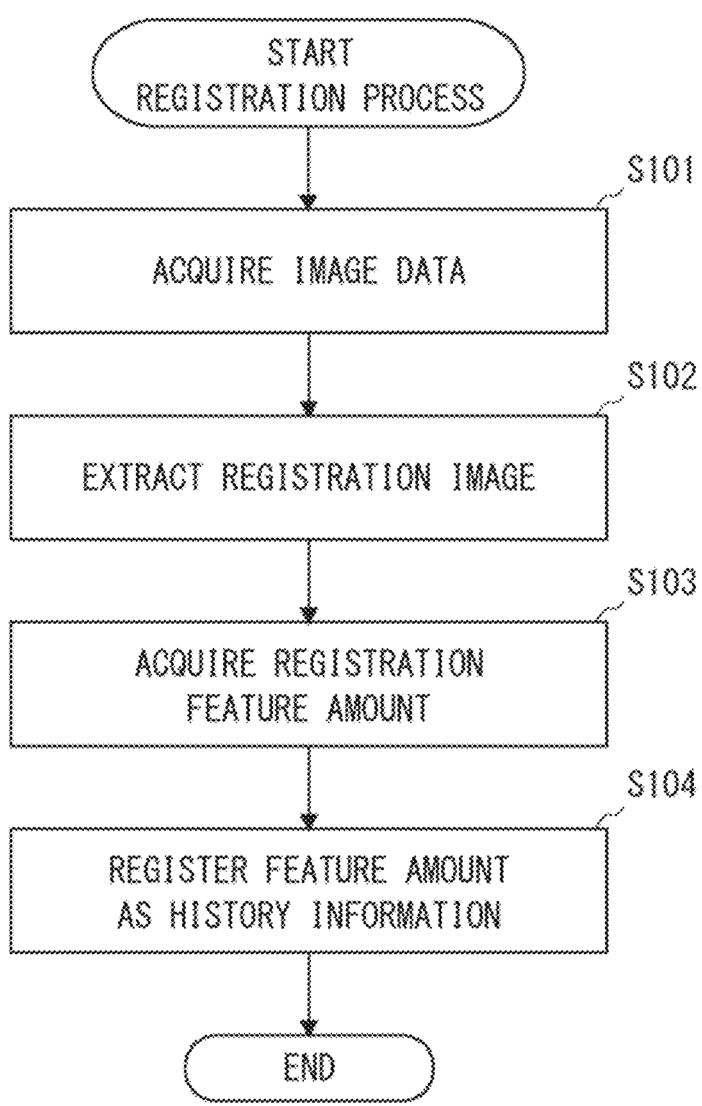
FIG. 5 is a flowchart illustrating a method of registering history information in the authentication system.

FIG. 5 is a flowchart illustrating a method of registering history information in the authentication system 2. The flowchart of FIG. 5 illustrates a process of registering a reference feature amount. The flowchart of FIG. 5 is started, for example, when an administrator of the user terminal 300 performs a predetermined operation for registering a new reference feature amount.

First, the authentication system 2 acquires image data of the authentication target object 90 to be registered (step S101). More specifically, the camera 310 images the authentication target object 90, and the user terminal 300 acquires image data.

Next, the authentication system 2 extracts a registration image from the acquired image data (step S102). The registration image is an image for acquiring a registration feature amount, and is an image of the same region as the authentication target image. More specifically, the authentication target image extraction unit 302 extracts a predetermined image from the image data.

Next, the authentication system 2 acquires a feature amount corresponding to the registration image (step S103). Specifically, the user terminal 300 supplies the registration image to the authentication apparatus 100, and the feature amount acquisition unit 11 of the authentication apparatus 100 extracts a feature amount from the registration image.

Next, the authentication system 2 stores the acquired feature amount in the storage unit 20 as the history information 21 (step S104). The feature amount stored in the storage unit 20 is a reference feature amount when the authentication target object 90 related to registration is authenticated. When the registration of the feature amount in the history information 21 is ended, the authentication system 2 ends a series of registration processes. By performing the above registration processes, the authentication target object related to the registration can receive subsequent authentication.

Figure 6:
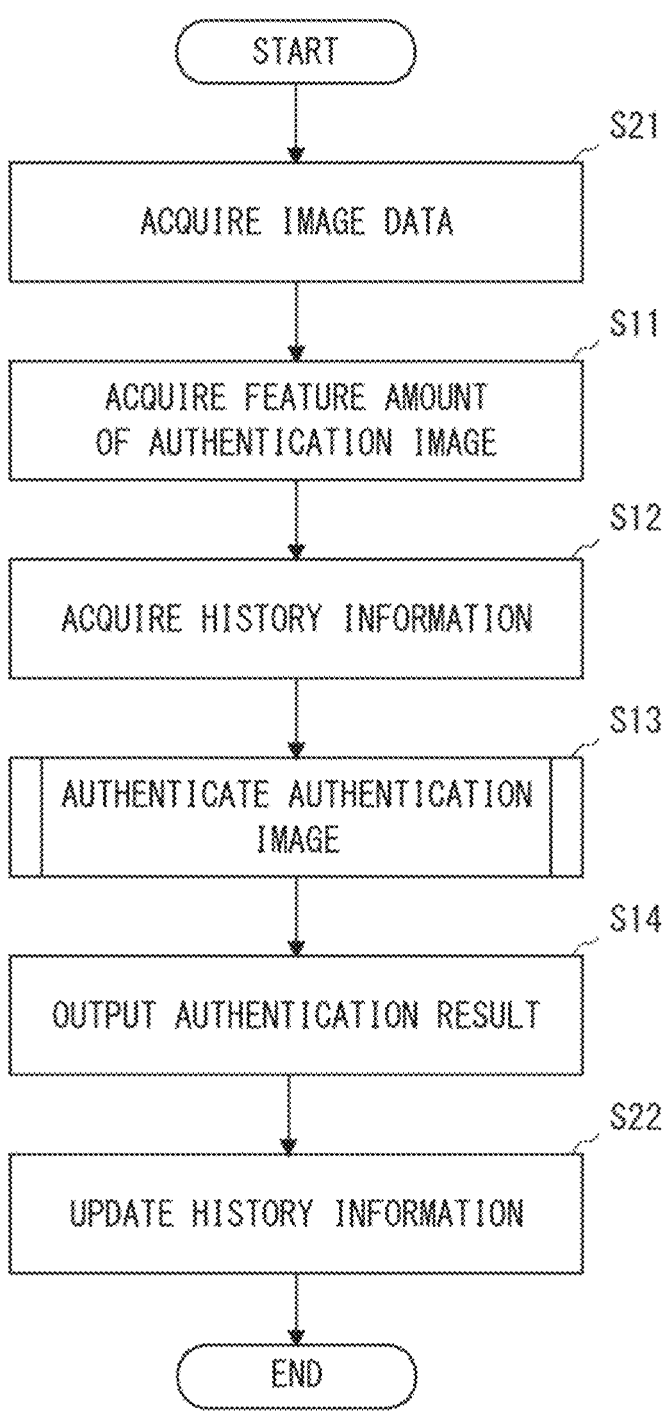
FIG. 6 is a flowchart illustrating an authentication method in the authentication system.

Next, a method in which the authentication system 2 authenticates the registered authentication target object 90 will be described with reference to FIG. 6. FIG. 6 is a flowchart illustrating an authentication method executed by the authentication apparatus 100 of the authentication system 2. The flowchart of FIG. 6 is started, for example, when the camera 310 captures an image of the authentication target object 90 and the user terminal 300 supplies an authentication target image related to the captured image to the authentication apparatus 100. The flowchart of FIG. 6 is different from the flowchart of FIG. 2 in that step S21 is executed before step S11. The flowchart of FIG. 6 is different from the flowchart of FIG. 2 in that step S22 is executed after step S14.

First, in the authentication apparatus 100, the image data acquisition unit 15 acquires an authentication target image from the user terminal 300 (step S21). Upon receiving the authentication target image, the image data acquisition unit 15 supplies the received authentication target image to the feature amount acquisition unit 11.

Steps S11 to S14 are similar to the processes illustrated in FIG. 2. Therefore, detailed descriptions thereof will be omitted here.

After step S14, the storage unit 20 updates the history information 21 to the predetermined information related to the authentication performed in step S13 (step S22). When the storage unit 20 updates the history information 21, the authentication system 2 ends a series of processes.

Figure 7:
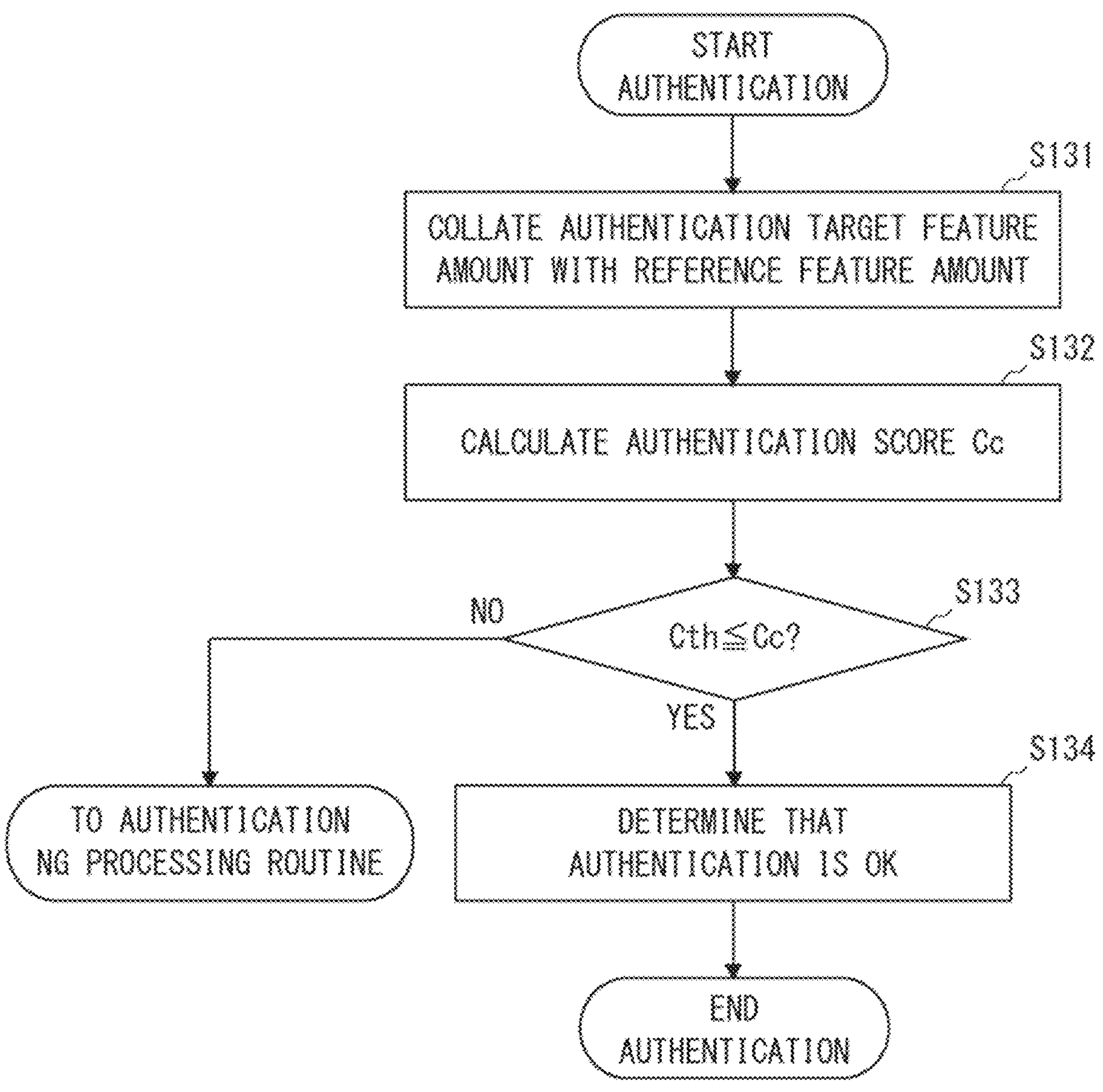
FIG. 7 is a flowchart illustrating details of an authentication method.

Next, details of authentication performed by the authentication unit 13 will be described with reference to FIG. 7. FIG. 7 is a flowchart illustrating details of an authentication method. The flowchart of FIG. 7 illustrates step S13 in FIG. 6 in more detail.

First, the collation unit 131 of the authentication unit 13 collates the authentication target feature amount received from the feature amount acquisition unit 11 with the reference feature amount read from the storage unit 20 (step S131).

Next, the authentication score calculation unit 132 of the authentication unit 13 calculates an authentication score Cc from a result of the collation performed by the collation unit 131 (step S132).

Next, the determination unit 133 determines whether the authentication score Cc calculated by the authentication score calculation unit 132 is equal to or more than a predetermined threshold Cth (step S133). In a case where the authentication score Cc is less than the threshold Cth, this indicates that the authentication target feature amount and the reference feature amount are not similar to each other. On the other hand, in a case where the authentication score Cc is equal to or more than the threshold Cth, this indicates that the authentication target feature amount is similar to the reference feature amount.

In a case where it is determined that the authentication score Cc is not equal to or more than the threshold Cth (step S133: NO), the authentication unit 13 proceeds to an authentication NG processing routine. Note that the authentication NG processing routine is processing in a case where the authentication is NG, that is, authentication cannot be performed. The authentication NG processing is executed according to a technique already known to those skilled in the art, but a description thereof will be omitted here. In the case where the authentication is NG, the authentication unit 13 supplies a signal indicating that the authentication is NG to the output unit 14.

In a case where it is determined that the authentication score Cc is equal to or more than the threshold Cth (step S133: YES), the authentication unit 13 determines that the authentication is OK (step S134). In a case where the authentication is OK, the authentication unit 13 supplies a signal indicating that the authentication is OK to the output unit 14.

Next, the history information will be described with reference to FIG. 8. FIG. 8 is a table illustrating the history information 21. The history information 21 illustrated in FIG. 8 stores the authentication process execution date and time (T), an acquired feature amount, a referred-to feature amount, and the authentication score Cc in association with each other.

The authentication process execution date and time (T) is a date and time in a case where the authentication unit 13 executes the authentication process. Note that, here, for convenience of description, the reference sign "T" is assigned to the authentication process execution date and time, and the reference signs T11 to T13 are assigned to information regarding the date and time in a case where the authentication process is actually performed. In addition, the date and time T12 is after the date and time T11, and the date and time T13 is after the date and time T12.

The acquired feature amount is a feature amount acquired by the authentication system 2 from the authentication target object 90 in each authentication process. That is, the acquired feature amount can be said to be an authentication target feature amount at the time of acquisition. In FIG. 8, for convenience of description, the feature amount is indicated by the letter "F" and a three-digit number, but data indicating an actual feature amount is different from such a configuration.

The referred-to feature amount is a feature amount read from the storage unit 20 by the authentication system 2 in each authentication process and collated with the authentication target feature amount. That is, the referred-to feature amount can be said to be a reference feature amount at the time at which the process is performed.

The authentication score Cc is an authentication score calculated by the authentication score calculation unit 132 of the authentication unit 13 in each authentication process.

In the history information 21 illustrated in FIG. 8, for example, in the authentication process at the time point of the date and time T=T11, the acquired feature amount (authentication target feature amount) is F019, the referred-to feature amount (reference feature amount) is F018, and the authentication score Cc as a result of collating F019 and F018 is 0.79. Similarly, in the authentication process at the time point of the date and time T=T12 after the date and time T=T11, the acquired feature amount is F020, the referred-to feature amount is F019, and the authentication score Cc as a result of collating F020 and F019 is 0.86. In the authentication process at the time point of the date and time T=T13 after the date and time T=T12, the acquired feature amount is F021, the referred-to feature amount is F020, and the authentication score Cc as a result of collating F021 and F020 is 0.83.

As described above, the history information 21 includes information regarding the authentication process executed in a plurality of different past dates and times. Further, as illustrated in the history information 21, as a feature amount referred to in an authentication process, a feature amount acquired by the authentication system 2 in the most recently performed authentication process that was performed before the authentication process is selected. As described above, the authentication system 2 collates the feature amount acquired most recently in the past with the feature amount acquired in the current process. As a result, the authentication system 2 can suitably perform authentication by using the feature amount that changes with the temporal change in the authentication target object 90.

Figure 9:
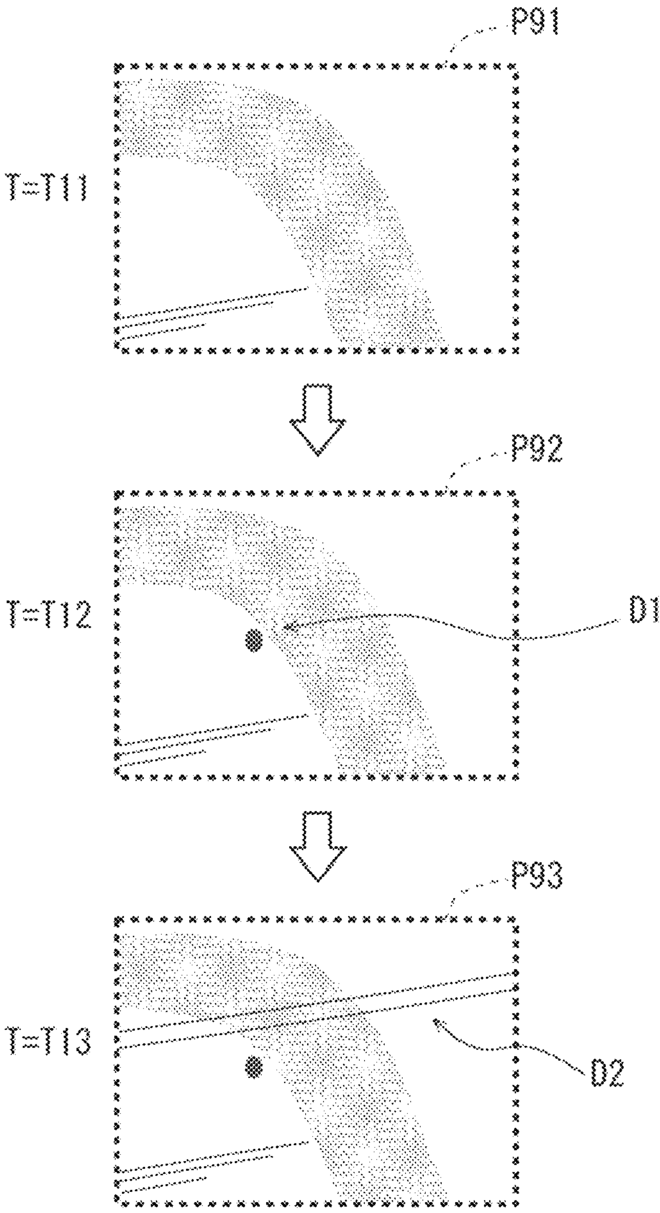
FIG. 9 is a diagram illustrating a state of an authentication target image.

Next, a state of an authentication target image will be described with reference to FIG. 9. FIG. 9 is a diagram illustrating a state of an authentication target image. FIG. 9 illustrates a first image P91, a second image P92, and a third image P93 in order from the top. The first image P91 is an authentication target image extracted at the date and time T=T11 in the table illustrated in FIG. 8. That is, a feature amount of the first image P91 is F019. Similarly, the second image P92 is an authentication target image extracted at the date and time T=T12 in the table illustrated in FIG. 8. That is, a feature amount of the second image P92 is F20. The third image P93 is an authentication target image extracted at the date and time T=T13 in the table illustrated in FIG. 8. That is, a feature amount of the third image P93 is F21.

The first image P91, the second image P92, and the third image P93 are images of the same region in the authentication target object 90, but a change occurs with the lapse of time. In FIG. 9, the second image P92 is an image acquired after the first image P91, and a flaw D1 increases at the center of the image. The third image P93 is an image acquired after the second image P92, and a flaw D2 further increases in the upper part of the image in addition to the flaw D1.

In the above-described status, the authentication system 2 compares the authentication target image acquired at the time of authentication with the most recent image. As a result, authentication can be performed by using the features of the authentication target image that change with time.

Although the second example embodiment has been described above, the authentication system 2 illustrated in the second example embodiment is not limited to the above-described configuration.

For example, the authentication apparatus 100 may include the image data acquisition unit 301 and the authentication target image extraction unit 302 included in the user terminal 300. In this case, the authentication apparatus 100 receives image data generated by the camera 310 from the user terminal 300, extracts an authentication target image from the image data of the authentication target object 90, and supplies the authentication target image to the feature amount acquisition unit 11.

Furthermore, for example, a plurality of user terminals 300 may be connected to the authentication apparatus 100. With such a configuration, the authentication system 2 can perform authentication of the authentication target object 90 in a unified and cross-sectional manner in each of the user terminal 300, the camera 310, the display apparatus 320, and the information input apparatus 330 installed in a plurality of places.

Furthermore, the history information 21 may store, for example, the most recent history information in the past and overwrite the history information every time a new authentication process is executed.

As described above, according to the present example embodiment, it is possible to provide an authentication system or the like that efficiently authenticates an authentication target object.

Third Example Embodiment

Next, a third example embodiment will be described. The third example embodiment is different from the above-described example embodiments in processing of the authentication unit 13.

The storage unit 20 according to the present example embodiment stores a plurality of reference feature amounts acquired in authentication performed at a plurality of different times (or dates and times) together with time information indicating that the reference feature amounts have been acquired. The storage unit 20 according to the present example embodiment also stores authentication scores in authentication corresponding to the plurality of reference feature amounts.

The authentication unit 13 according to the present example embodiment performs authentication by collating the most recent reference feature amount among the plurality of reference feature amounts with an authentication target feature amount. In addition, the authentication unit 13 performs authentication in consideration of a change in the authentication score with the lapse of time. More specifically, the authentication unit 13 calculates an expected value for the authentication score related to the authentication target feature amount, and performs authentication in consideration of the expected value in authentication.

The expected value for the authentication score related to the authentication target feature amount is the current or future authentication score estimated from a value of the authentication score calculated in the past authentication and the date and time on which the authentication score was calculated. The authentication system 2 estimates a temporal change in the authentication target image on the basis of the expected value.

A state of the authentication target object 90, such as a flaw or dirt, varies depending on a usage status of an owner, a usage frequency, and the like. Therefore, the authentication system 2 according to the present example embodiment individually estimates a value of the authentication score from a state of the change in the past authentication score, and performs authentication using an expected value to be estimated.

For example, even in a case where it is determined that authentication can be performed from comparison between the authentication score and a threshold, the authentication unit 13 according to the present example embodiment determines that the authentication cannot be performed in a case where the authentication score does not correspond to the expected value. With such a configuration, for example, in a case where a user of the authentication target object 90 changes due to theft or the like, it is possible to ascertain a status of the authentication score caused by the change in a usage status and to determine the authentication.

Figure 10:
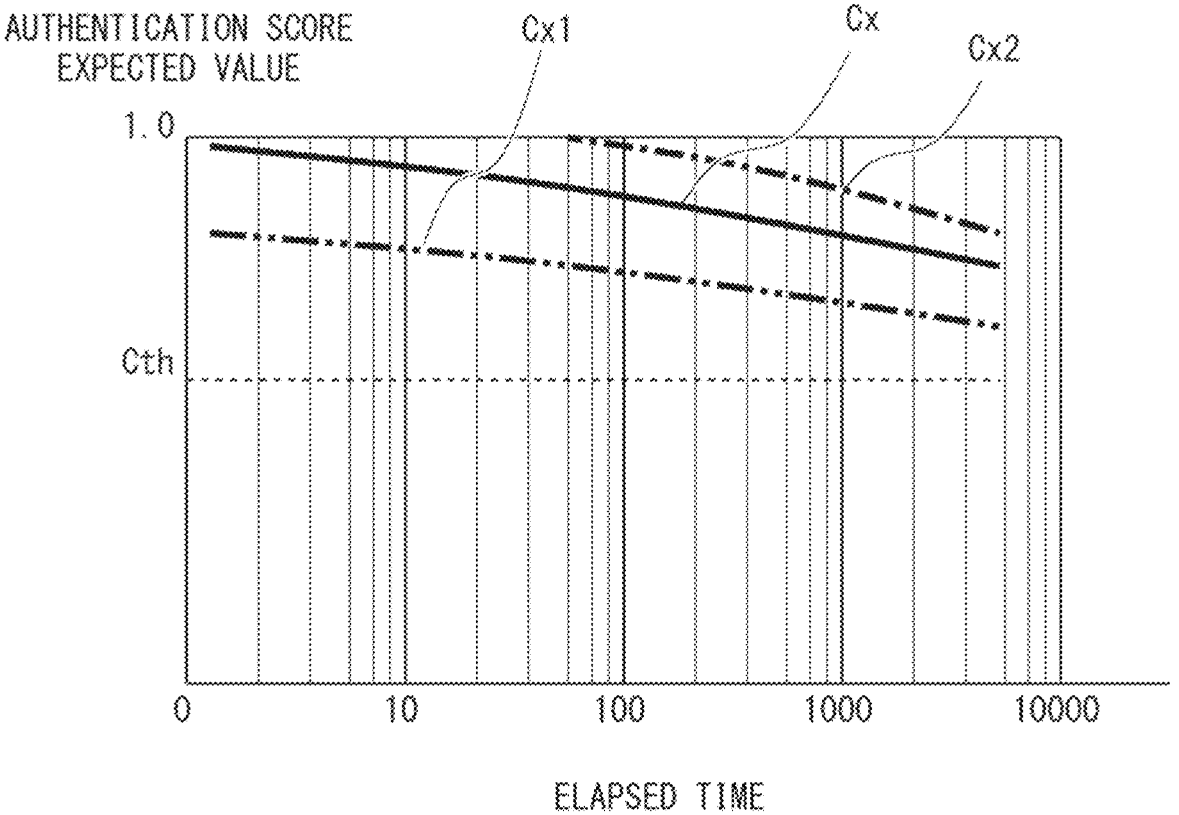
FIG. 10 is a graph illustrating expected values according to a third example embodiment.

FIG. 10 is a graph illustrating an expected value according to the third example embodiment. In the graph illustrated in FIG. 10, the horizontal axis represents logarithmic notation of the elapsed time, and the vertical axis represents an expected value of the authentication score. A curve plotted by a thick solid line in this graph is a calculated expected value Cx of the authentication target object 90. In addition, a curve plotted by a bold two-dot chain line below the expected value Cx is a lower limit expected value Cx1 calculated from the expected value Cx. A curve plotted by a one-dot chain line in the information of the expected value Cx is an upper limit expected value Cx2 calculated from the expected value Cx. Further, a straight line extending in the left-right direction plotted by a dotted line below the lower limit expected value Cx1 is a threshold Cth of the authentication score.

The expected value Cx indicates, in a case where a time point of the most recent authentication in the past is set to an elapsed time of zero (0), an authentication score that temporally changes from the time point. For example, in the case of the authentication target object 90 having a small temporal change, the slope of the expected value Cx is relatively gentle, and in the case of the authentication target object 90 having a large deterioration over time, the slope of the expected value Cx is relatively large, and the right side of the curve tends to decrease. The expected value Cx is generated from past results, and each of the authentication target objects 90 may have a unique expected value Cx.

The lower limit expected value Cx1 and the upper limit expected value Cx2 are, for example, curves plotted at positions about 20% away from the value of the expected value Cx. The lower limit expected value Cx1 and the upper limit expected value Cx2 are set in consideration of variations occurring in the actual authentication score. For example, the authentication system 2 according to the present example embodiment determines that the authentication is NG in a case where the authentication score calculated at the time of the authentication is out of the range of the lower limit expected value Cx1 and the upper limit expected value Cx2.

Note that the authentication system 2 preferably stores the above-described information regarding the expected value together with the history information 21.

Figure 11:
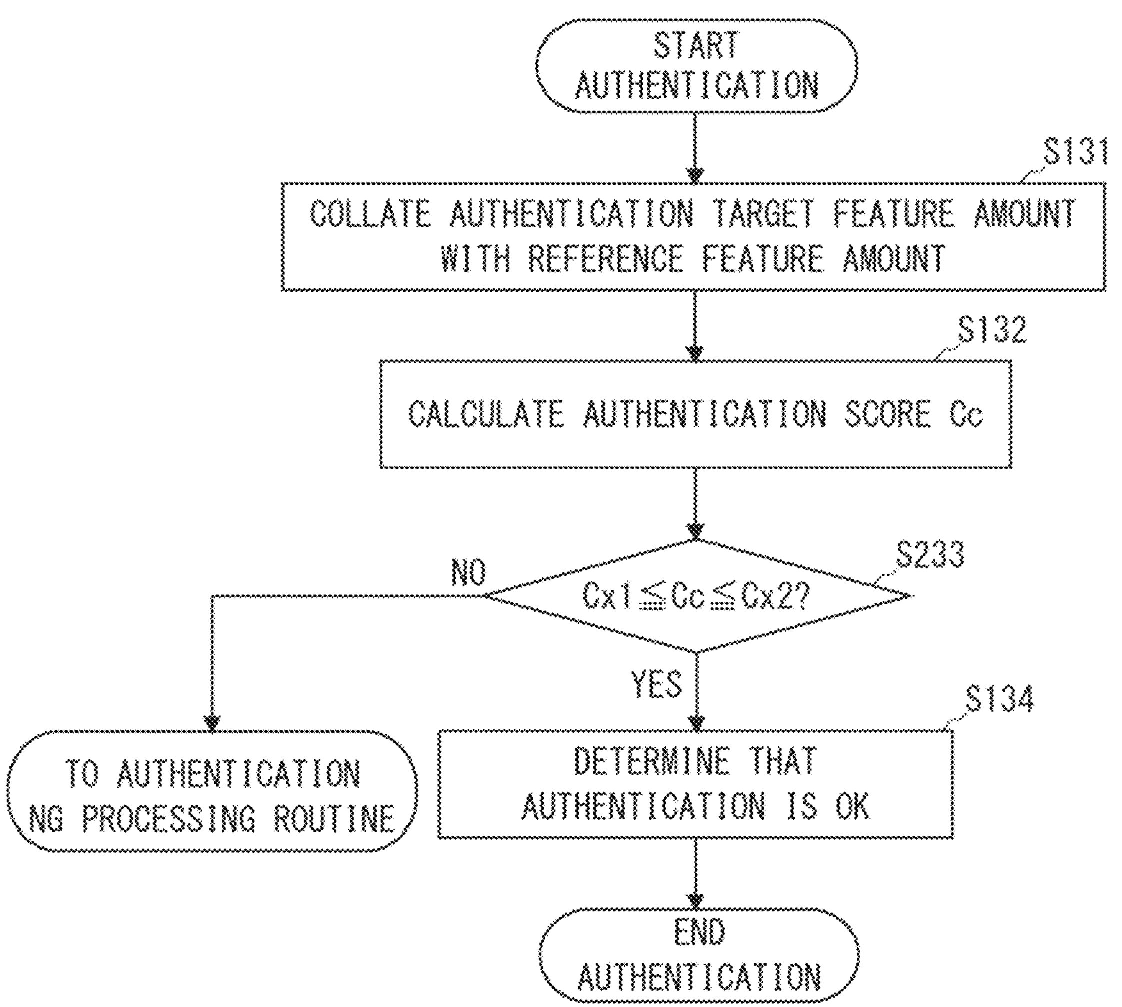
FIG. 11 is a flowchart illustrating an authentication method according to the third example embodiment.

An authentication method in the present example embodiment will be described with reference to FIG. 11. FIG. 11 is a flowchart illustrating an authentication method according to the third example embodiment. The flowchart of FIG. 11 is different from the flowchart of FIG. 7 in processes between step S132 and step S134.

In step S233 after step S132, the determination unit 133 determines whether the authentication score Cc calculated by the authentication score calculation unit 132 is equal to or more than the lower limit expected value Cx1 and equal to or less than the upper limit expected value Cx2 (step S233).

In a case where the authentication score Cc is out of the above range, this indicates that a usage status of the authentication target object 90 has greatly changed from the past status. On the other hand, in a case where the authentication score Cc is within the above range, this indicates that the authentication target feature amount and the reference feature amount are similar, and the usage status of the authentication target object 90 has not greatly changed.

In a case where it is determined that the authentication score Cc is not equal to or more than the lower limit expected value Cx1 and equal to or less than the upper limit expected value Cx2 (step S233: NO), the authentication unit 13 proceeds to an authentication NG processing routine. On the other hand, in a case where it is determined that the authentication score Cc is equal to or more than the lower limit expected value Cx1 and equal to or less than the upper limit expected value Cx2 (step S233: YES), the authentication unit 13 determines that the authentication is OK (step S134). In a case where the authentication is OK, the authentication unit 13 supplies a signal indicating that the authentication is OK to the output unit 14.

The third example embodiment has been described above. According to the above configuration, a change in a usage status or a change in a user can be used for determination of authentication. Processing performed by the authentication system 2 according to the third example embodiment is not limited to the above-described processing. For example, in a case where it is determined that the authentication score Cc is not equal to or more than the lower limit expected value Cx1 and equal to or less than the upper limit expected value Cx2 (step S233: NO), the authentication system 2 may issue an alert indicating caution instead of determining that the authentication is NG. As a result, for example, an administrator of the user terminal 300 may employ further authentication for the authentication of the authentication target object 90 by using means different from the above content. By performing such two-stage authentication, the authentication system 2 can realize more secure authentication.

As described above, according to the present example embodiment, it is possible to provide an authentication system or the like that efficiently authenticates an authentication target object.

Fourth Example Embodiment

Next, a fourth example embodiment will be described. The authentication system 2 according to the fourth example embodiment is different from the above-described example embodiments in that an initial feature amount is used.

The storage unit 20 according to the present example embodiment further stores an initial feature amount of the authentication target object 90 in the history information 21. The authentication system 2 acquires an initial feature amount according to the method of the flowchart of FIG. 5. However, the authentication system 2 in the present example embodiment handles the initial feature amount as being different from other reference feature amounts. That is, the authentication system 2 in the present example embodiment continues to store the initial feature amount.

In addition, the authentication unit 13 according to the present example embodiment performs first authentication on the basis of the authentication target feature amount and the initial feature amount, and performs second authentication on the basis of the authentication target feature amount and the reference feature amount.

The first authentication is an authentication method of comparing a cumulative authentication score with a reference cumulative authentication score. The cumulative authentication score is an authentication score calculated by collating the authentication target feature amount with the initial feature amount. The reference cumulative authentication score is a reference cumulative authentication score at the most recent time point in the past.

As the authentication target object 90 temporally changes, the cumulative authentication score tends to decrease with the lapse of time. Therefore, in the first authentication, the authentication unit 13 compares the reference cumulative authentication score with the cumulative authentication score, and sets a condition that the cumulative authentication score is equal to or less than the reference cumulative authentication score as a condition for the authentication.

Note that the storage unit 20 in the present example embodiment preferably stores the cumulative authentication score described above together.

The second authentication is authentication using an authentication score calculated by collating the authentication target feature amount with the reference feature amount and the threshold Cth. That is, the second authentication is the same as the authentication described with reference to FIG. 7.

The authentication unit 13 according to the present example embodiment performs the first authentication and the second authentication, and determines that authentication can be performed in a case where both the first authentication and the second authentication are satisfied.

Figure 12:
FIG. 12 is a graph illustrating a transition of an authentication score according to a fourth example embodiment.
Figure 12:
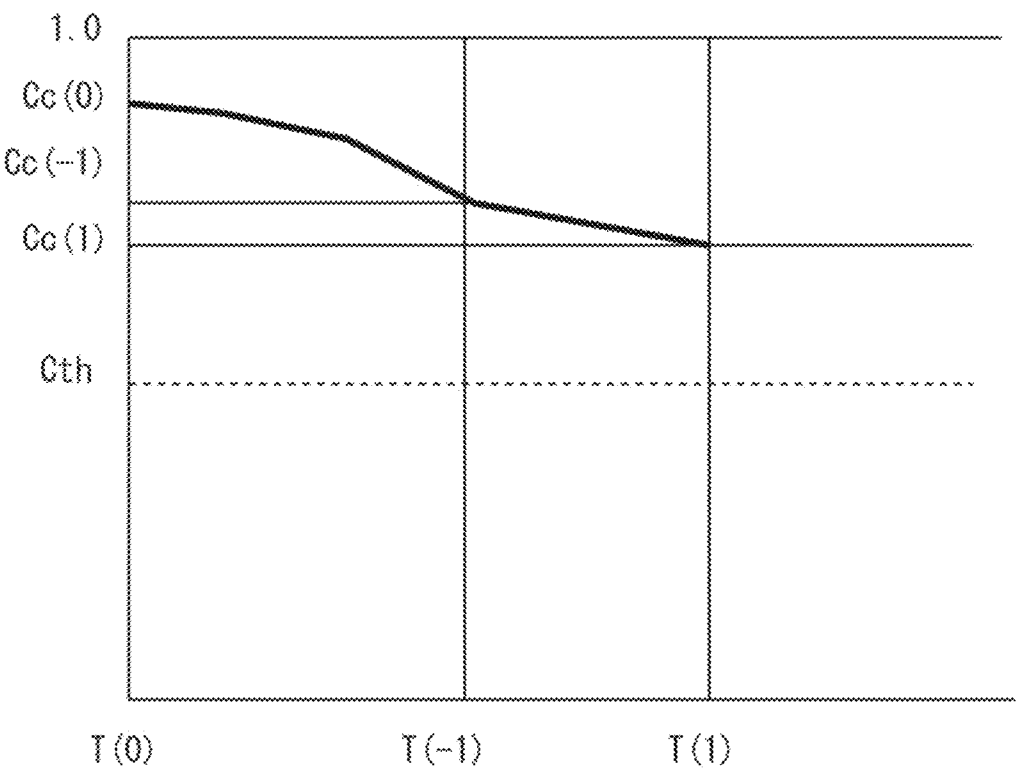

FIG. 12 is a graph illustrating a transition of authentication scores according to the fourth example embodiment. In the graph of FIG. 12, the horizontal axis represents a cumulative elapsed time from a time point at which an initial feature amount is acquired. In the graph of FIG. 12, the vertical axis represents an authentication score (cumulative authentication score) calculated through collation with the initial feature amount.

A folded line plotted in the graph of FIG. 12 indicates a transition of the cumulative authentication score. In the example of the graph of FIG. 12, the initial authentication score at the cumulative elapsed time TT=T(0) is indicated as Cc(0). The cumulative authentication score at TT=T(−1) after the elapsed time TT=T(0) is Cc(−1). The cumulative authentication score Cc(−1) is a value lower than the initial authentication score Cc(0). Further, the cumulative authentication score at TT=T(1) after the elapsed time TT=T(−1) is Cc(1). The cumulative authentication score Cc(1) is a value lower than the cumulative authentication score Cc(−1).

Thus, the cumulative authentication score tends to gradually decrease with the lapse of time. Therefore, in a case where the cumulative authentication score is obviously higher than the past cumulative authentication score, it is determined that a change in the state of the authentication target object 90 is unnatural.

Figure 13:
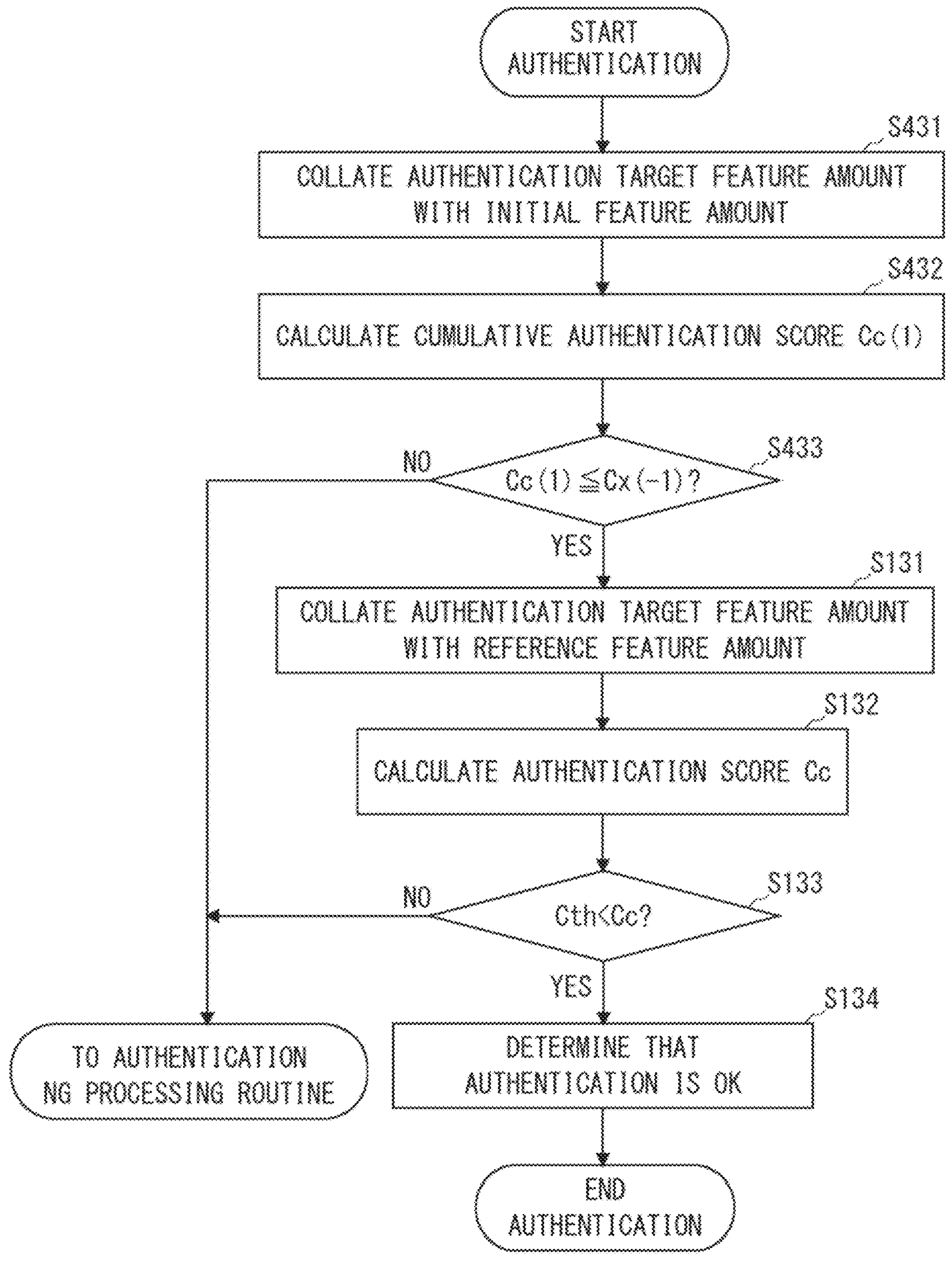
FIG. 13 is a flowchart illustrating an authentication method according to the fourth example embodiment.

FIG. 13 is a flowchart illustrating an authentication method according to the fourth example embodiment. The flowchart of FIG. 13 is different from the flowchart of FIG. 7 in processes before step S131.

First, the collation unit 131 of the authentication unit 13 collates the authentication target feature amount with the initial feature amount (step S431). The collation unit 131 supplies information regarding a result of collation between the authentication target feature amount and the initial feature amount to the authentication score calculation unit 132.

Next, the authentication score calculation unit 132 calculates the cumulative authentication score Cc(1) from the result of collation between the authentication target feature amount and the initial feature amount (step S432). The authentication score calculation unit 132 supplies the calculated cumulative authentication score Cc(1) to the determination unit 133.

Next, the determination unit 133 compares the cumulative authentication score Cc(1) received from the authentication score calculation unit 132 with the reference cumulative authentication score Cc(−1) stored in the history information 21, and determines whether or not the cumulative authentication score Cc(1) is equal to or lower than the reference cumulative authentication score Cc(−1) (step S433).

In a case where it is determined that the cumulative authentication score Cc(1) is not equal to or lower than the reference cumulative authentication score Cc(−1) (step S433: NO), the authentication unit 13 proceeds to an authentication NG processing routine. On the other hand, in a case where it is determined that the cumulative authentication score Cc(1) is equal to or lower than the reference cumulative authentication score Cc(−1) (step S433: YES), the authentication unit 13 proceeds to step S131 and performs processing equivalent to the processing illustrated in FIG. 7 as the second authentication.

The fourth example embodiment has been described above. In the above processing, the authentication system 2 may perform the second authentication before and after the first authentication. That is, in the flowchart of FIG. 13, steps S131 to S133 may be executed first. Alternatively, the authentication system 2 may execute the first authentication and the second authentication in parallel.

According to the present example embodiment, it is possible to provide an authentication system or the like that efficiently authenticates an authentication target object.

Fifth Example Embodiment

Next, a fifth example embodiment will be described. The fifth example embodiment is different from the above-described example embodiments in processing executed by the feature amount acquisition unit 11 and processing executed by the authentication unit 13.

The feature amount acquisition unit 11 according to the present example embodiment acquires each of authentication target feature amounts from a plurality of authentication target images defined in regions at least partially different from each other.

In this case, for example, the feature amount acquisition unit 11 may divide the authentication target image received from the user terminal 300 into a plurality of images. Alternatively, in the authentication system 2, the authentication target image extraction unit 302 may extract a plurality of authentication target images and supply the plurality of extracted authentication images to the authentication apparatus 100.

The authentication unit 13 according to the present example embodiment performs authentication for a plurality of authentication target feature amounts, and performs authentication by collating the plurality of authentication target feature amounts with reference feature amounts corresponding to the respective authentication target feature amounts.

Figure 14:
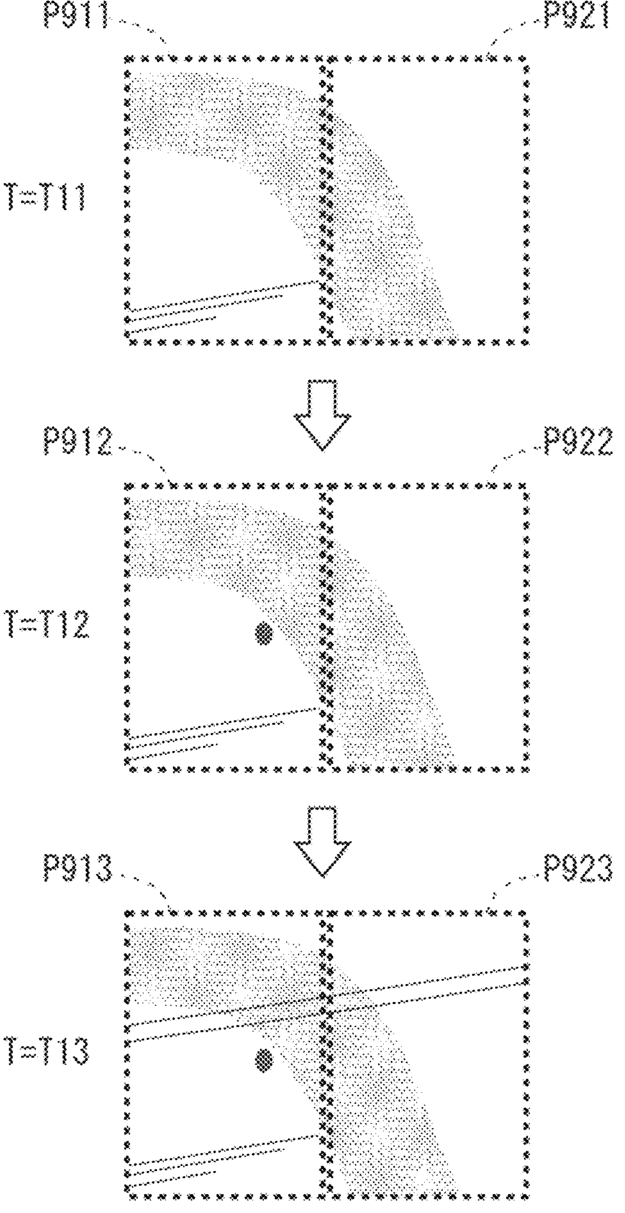
FIG. 14 is a diagram illustrating a state of an authentication target image according to a fifth example embodiment.

FIG. 14 is a diagram illustrating a state of an authentication target image according to the fifth example embodiment. FIG. 14 illustrates an authentication target image corresponding to FIG. 9. However, the authentication target image is divided into right and left parts. The left part of the image acquired at the date and time T=T11 is an eleventh image P911, and the right part thereof is a twenty-first image P921.

In the above-described status, the authentication system 2 performs authentication for each of the two authentication target images. By handling the authentication target image as a plurality of images having at least different regions as described above, it is possible to determine a state such as a flaw caused by a temporal change in the authentication target image in more detail.

The fifth example embodiment has been described above. In the above configuration, the authentication system 2 extracts two or more authentication target images. The plurality of authentication target images may partially overlap or may be separated from each other.

According to the present example embodiment, it is possible to provide an authentication system or the like that efficiently authenticates an authentication target object.

<Example of Hardware Configuration>

Hereinafter, a case where each functional configuration of the authentication system in the present disclosure is realized by a combination of hardware and software will be described.

Figure 15:
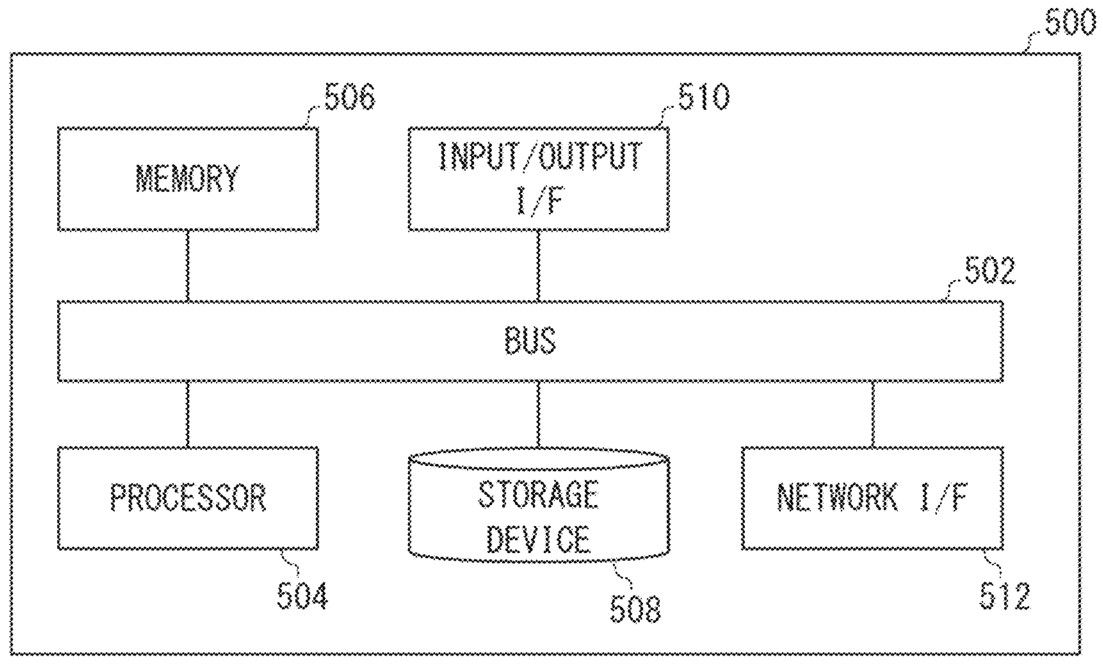
FIG. 15 is a block diagram illustrating a hardware configuration of a computer.

FIG. 15 is a block diagram illustrating a hardware configuration of a computer. A authentication system in the present disclosure can realize the above-described functions by using a computer 500 having the hardware configuration illustrated in the diagram. The computer 500 may be a portable computer such as a smartphone or a tablet terminal, or may be a stationary computer such as a PC. The computer 500 may be a dedicated computer designed to implement each apparatus, or may be a general-purpose computer. The computer 500 can realize a desired function by installing a predetermined program.

The computer 500 includes a bus 502, a processor 504, a memory 506, a storage device 508, an input/output interface 510 (the interface will also be referred to as an I/F (interface)), and a network interface 512. The bus 502 is a data transmission path for the processor 504, the memory 506, the storage device 508, the input/output interface 510, and the network interface 512 to transmit and receive data to and from each other. However, a method of connecting the processor 504 and the like to each other is not limited to the bus connection.

The processor 504 is various processors such as a CPU, a GPU or an FPGA. The memory 506 is a primary storage device realized by using a random access memory (RAM) or the like.

The storage device 508 is an auxiliary storage device implemented by using a hard disk, an SSD, a memory card, a read only memory (ROM), or the like. The storage device 508 stores a program for realizing a desired function. The processor 504 reads the program to the memory 506 and executes the program to realize each functional constituent unit of each apparatus.

The input/output interface 510 is an interface connecting the computer 500 and an input/output device. For example, an input device such as a keyboard and an output device such as a display device are connected to the input/output interface 510.

The network interface 512 is an interface connecting the computer 500 to a network.

Although the example of the hardware configuration in the present disclosure has been described above, the above-described example embodiment is not limited thereto. The present disclosure can also be implemented by causing a processor to execute a computer program.

In the above-described example, the program includes a group of instructions (or software code) for causing a computer to execute one or more functions described in the example embodiments when being read by the computer. The program may be stored in a non-transitory computer readable medium or a tangible storage medium. As an example and not by way of limitation, a computer readable medium or tangible storage medium includes a random-access memory (RAM), a read-only memory (ROM), a flash memory, a solid-state drive (SSD) or other memory technology, a CD-ROM, a digital versatile disc (DVD), a Blu-ray (registered trademark) disk or other optical disk storage, a magnetic cassette, a magnetic tape, a magnetic disk storage, or other magnetic storage devices. The program may be transmitted on a transitory computer readable medium or a communication medium. As an example and not by way of limitation, transitory computer readable medium or communication medium include electrical, optical, acoustic, or other forms of propagated signals.

Although the invention of the present application has been described above with reference to the example embodiments, the invention of the present application is not limited to the above. Various modifications that can be understood by those skilled in the art can be made to the configuration and details of the invention of the present application within the scope of the invention.

Some or all of the above example embodiments may be described as the following supplementary notes, but are not limited to the following.

(Supplementary Note 1)

An authentication system including:

feature amount acquisition means for acquiring an authentication target feature amount that is a feature amount of an authentication target image defined from an image obtained by imaging a predetermined authentication target object;

history information acquisition means for acquiring history information regarding an authentication history of the authentication target object on the basis of the authentication target feature amount;

authentication means for performing authentication of the authentication target object on the basis of the authentication target feature amount and the history information; and output means for outputting a result of the authentication.

(Supplementary Note 2)

The authentication system according to Supplementary Note 1, in which the history information acquisition means acquires the history information including a reference feature amount of the authentication target image acquired at a time before a time at which the authentication target feature amount is acquired, and the authentication means performs the authentication by collating the authentication target feature amount with the reference feature amount.

(Supplementary Note 3)

The authentication system according to Supplementary Note 2, in which the authentication means calculates an authentication score by collating the authentication target feature amount with the reference feature amount, and performs the authentication by comparing a value of the authentication score with a predetermined threshold.

(Supplementary Note 4)

The authentication system according to Supplementary Note 3, further including storage means for storing the history information, in which the storage means updates the history information on the basis of the authentication.

(Supplementary Note 5)

The authentication system according to Supplementary Note 4, in which the storage means causes the authentication target feature amount to be included in the history information as the reference feature amount after the authentication is ended.

(Supplementary Note 6)

The authentication system according to Supplementary Note 5, in which the storage means stores a plurality of the reference feature amounts respectively acquired in the authentication performed at a plurality of different times and time information at which the reference feature amount is acquired together.

(Supplementary Note 7)

The authentication system according to Supplementary Note 6, in which the authentication means performs the authentication by collating the most recent reference feature amount among the plurality of reference feature amounts with the authentication target feature amount.

(Supplementary Note 8)

The authentication system according to Supplementary Note 6 or 7, in which the storage means also stores authentication scores in the authentication corresponding to the plurality of reference feature amounts.

(Supplementary Note 9)

The authentication system according to any one of Supplementary Notes 6 to 8, in which the authentication means calculates an expected value of the authentication score related to the authentication target feature amount on the basis of a change in the authentication score with a lapse of time, and performs the authentication in consideration of the expected value in the authentication.

(Supplementary Note 10)

The authentication system according to Supplementary Note 9, in which the authentication means determines that the authentication is not able to be performed in a case where the authentication score and the expected value do not correspond to each other even in a case where it is determined that the authentication is able to be performed from comparison between the authentication score and the threshold.

(Supplementary Note 11)

The authentication system according to any one of Supplementary Notes 4 to 10, in which the storage means further stores an initial feature amount related to the authentication target object in the history information, and the authentication means performs first authentication on the basis of the authentication target feature amount and the initial feature amount, and performs second authentication on the basis of the authentication target feature amount and the reference feature amount.

(Supplementary Note 12)

The authentication system according to Supplementary Note 11, in which the authentication means performs the first authentication on the basis of a cumulative authentication score calculated by collating the authentication target feature amount with the initial feature amount and a reference cumulative authentication score at a most recent time point in the past, and performs the second authentication by using the authentication score calculated by collating the authentication target feature amount with the reference feature amount and the threshold.

(Supplementary Note 13)

The authentication system according to any one of Supplementary Notes 2 to 12, in which the feature amount acquisition means acquires the authentication target feature amount from a plurality of the authentication target images defined in regions at least partially different from each other, and the authentication means performs the authentication on a plurality of the authentication target feature amounts, and performs the authentication by collating the plurality of authentication target feature amounts with reference feature amounts corresponding to the respective authentication target feature amounts.

(Supplementary Note 14)

An authentication method of causing a computer to execute:

acquiring an authentication target feature amount that is a feature amount of an authentication target image defined from an image obtained by imaging a predetermined authentication target object;

acquiring history information regarding an authentication history of the authentication target object on the basis of the authentication target feature amount;

performing authentication of the authentication target object on the basis of the authentication target feature amount and the history information; and outputting a result of the authentication.

(Supplementary Note 15)

A non-transitory computer readable medium storing a program for causing a computer to execute an authentication method including:

acquiring an authentication target feature amount that is a feature amount of an authentication target image defined from an image obtained by imaging a predetermined authentication target object;

acquiring history information regarding an authentication history of the authentication target object on the basis of the authentication target feature amount;

performing authentication of the authentication target object on the basis of the authentication target feature amount and the history information; and outputting a result of the authentication.

REFERENCE SIGNS LIST

1 AUTHENTICATION SYSTEM
2 AUTHENTICATION SYSTEM
11 FEATURE AMOUNT ACQUISITION UNIT
12 HISTORY INFORMATION ACQUISITION UNIT
13 AUTHENTICATION UNIT
14 OUTPUT UNIT
15 IMAGE DATA ACQUISITION UNIT
16 COMMUNICATION UNIT
17 REGISTRATION UNIT
20 STORAGE UNIT
21 HISTORY INFORMATION
90 AUTHENTICATION TARGET OBJECT
100 AUTHENTICATION APPARATUS
131 COLLATION UNIT
132 AUTHENTICATION SCORE CALCULATION UNIT
133 DETERMINATION UNIT
300 USER TERMINAL
301 IMAGE DATA ACQUISITION UNIT
302 AUTHENTICATION TARGET IMAGE EXTRACTION UNIT
303 COMMUNICATION UNIT
304 UI CONTROL UNIT
310 CAMERA
320 DISPLAY APPARATUS
330 INFORMATION INPUT APPARATUS
500 COMPUTER
504 PROCESSOR
506 MEMORY
508 STORAGE DEVICE
510 INPUT/OUTPUT INTERFACE
512 NETWORK INTERFACE
N1 NETWORK

What is claimed is:

1. An authentication system comprising:

at least one memory storing instructions; and at least one processor configured to execute the instructions to:

acquire an authentication target feature amount that is a feature amount of an authentication target image defined from an image obtained by imaging an authentication target object;

acquire history information regarding an authentication history of the authentication target object including a reference feature amount of the authentication target image acquired at a time before a time at which the authentication target feature amount is acquired, and an initial feature amount related to the authentication target object;

perform authentication of the authentication target object by:

performing a first authentication on the basis of a cumulative authentication score calculated by collating the authentication target feature amount with the initial feature amount and a reference cumulative authentication score at a most recent time point in the past, and performing a second authentication by using an authentication score calculated by collating the authentication target feature amount with the reference feature amount and a predetermined threshold;

output a result of the authentication; and update the history information on the basis of the authentication.

2. The authentication system according to claim 1, wherein the at least one processor is further configured to execute the instructions to store the history information.

3. The authentication system according to claim 2, wherein the at least one processor is further configured to execute the instructions to cause the authentication target feature amount to be included in the history information as the reference feature amount after the authentication is ended.

4. The authentication system according to claim 3, wherein the at least one processor is further configured to execute the instructions to store a plurality of reference feature amounts respectively acquired in the authentication performed at a plurality of different times and time information at which the reference feature amount is acquired together.

5. The authentication system according to claim 4, wherein the at least one processor is further configured to execute the instructions to perform the authentication by collating a most recent reference feature amount among the plurality of reference feature amounts with the authentication target feature amount.

6. The authentication system according to claim 4, wherein the at least one processor is further configured to execute the instructions to also store authentication scores in the authentication corresponding to the plurality of reference feature amounts.

7. The authentication system according to claim 4, wherein the at least one processor is further configured to execute the instructions to calculate an expected value of the authentication score related to the authentication target feature amount on the basis of a change in the authentication score with a lapse of time, and perform the authentication in consideration of the expected value in the authentication.

8. The authentication system according to claim 7, wherein the at least one processor is further configured to execute the instructions to determine that the authentication is not able to be performed in a case where the authentication score and the expected value do not correspond to each other even in a case where it is determined that the authentication is able to be performed from comparison between the authentication score and the predetermined threshold.

9. The authentication system according to claim 1, wherein the at least one processor is further configured to execute the instructions to:

acquire the authentication target feature amount from a plurality of authentication target images defined in regions at least partially different from each other; and perform the authentication on a plurality of authentication target feature amounts, and perform the authentication by collating the plurality of authentication target feature amounts with reference feature amounts corresponding to respective authentication target feature amounts.

10. An authentication method of causing a computer to execute:

acquiring an authentication target feature amount that is a feature amount of an authentication target image defined from an image obtained by imaging an authentication target object;

acquiring history information regarding an authentication history of the authentication target object including a reference feature amount of the authentication target image acquired at a time before a time at which the authentication target feature amount is acquired, and an initial feature amount related to the authentication target object;

performing authentication of the authentication target object by:

performing a first authentication on the basis of a cumulative authentication score calculated by collating the authentication target feature amount with the initial feature amount and a reference cumulative authentication score at a most recent time point in the past, and performing a second authentication by using an authentication score calculated by collating the authentication target feature amount with the reference feature amount and a predetermined threshold;

outputting a result of the authentication; and updating the history information on the basis of the authentication.

11. A non-transitory computer readable medium storing a program for causing a computer to execute an authentication method comprising:

acquiring an authentication target feature amount that is a feature amount of an authentication target image defined from an image obtained by imaging an authentication target object;

acquiring history information regarding an authentication history of the authentication target object including a reference feature amount of the authentication target image acquired at a time before a time at which the authentication target feature amount is acquired, and an initial feature amount related to the authentication target object;

performing authentication of the authentication target object by:

performing a first authentication on the basis of a cumulative authentication score calculated by collating the authentication target feature amount with the initial feature amount and a reference cumulative authentication score at a most recent time point in the past, and performing a second authentication by using an authentication score calculated by collating the authentication target feature amount with the reference feature amount and a predetermined threshold;

outputting a result of the authentication; and updating the history information on the basis of the authentication.

* * * * *